UNITED STATES PATENT OFFICE 1,929,172

ART OF WORKING CLAY SLIPS

Robert Maynard King, Columbus, Ohio, assignor to National Aluminate Corporation, Chicago, Ill., a corporation of Delaware No Drawing. Application April 4, 1932
Serial No. 603,209

5 Claims. (Cl. 106—11)

The present invention relates to improvements in the treatment of clay slips, particularly for the manufacture of burnt clay products.

The invention consists substantially in the substitution of an aluminate such as sodium aluminate for sal soda in the usual sodium silicate-sal soda mixture which is added to clay slips to improve their working properties.

At the outset it should be distinctly understood that in the present case the substitution of the sodium aluminate is not the substitution of a known equivalent or of a substance which it could be suspected would have useful properties when used in accordance with the present invention. While it is true that sodium aluminate has an alkaline reaction, yet because it has the combination of a strongly basic metal—namely, sodium—with a somewhat less basic metal—namely, aluminum—both of these metals appear to exert an influence upon the clay slip or clay suspension, as will be more carefully pointed out hereinbelow.

The invention is particularly useful in connection with casting processes for the forming of clay ware.

It has long been known that electrolytes and certain colloids either deflocculate (disperse, peptize) or flocculate (coagulate) clay particles. Clays themselves may have a mutual deflocculating or flocculating action. It is also known that the action of different electroyltes is not of the same degree at a given concentration.

The above facts are applied in such operations as prepartion of glazes, engobes, and enamels for application to ware, in the purification of clays, and in the conditioning of slips, slurries or suspensions for the casting process by which products are made from clay alone, from nonplastic materials, or, more commonly, from mixtures of clay and such nonplastics as feldspar and flint. In this casting process the clay or mixture is stirred or blunged in water with a small percentage of some electrolyte, usually a combination of sodium silicate and sal soda (sodium carbonate). The slip thus prepared is poured into molds of plaster of Paris and allowed to remain until the walls of the piece to be made have reached a desired thickness on the sides of the mold. The surplus clay slip is then poured out.

In order to obtain the best results, even with a satisfactorily compounded mixture or body, several factors must be carefully controlled; for example, the amount of solid matter suspended in the water must be of such a nature and in such an amount that the clay slip will be possessed of good casting, pouring, draining and drying properties. It is also necessary to control the rate at which the layer of solid material is formed upon the plaster of Paris mold. The condition, that is to say, the hardness or softness of this layer of solid material, as well as its homogeneity, is particularly a function of the clay slip. With a slip containing the proper ratio of water and suspended solids this again depends upon the fluidity development and the degree of fluidity in the slip when poured.

It will also be obvious that the stability of the slip, particularly its stability as to ageing, is an important factor. In other words, the slip should, as far as possible, maintain its properties over a considerable period, so that when poured into molds it will act substantially the same and will not require different manipulation when it casts somewhat harder or softer than when first made.

A further important factor is the rate at which the ware "sets" and dries after drainage and after removal from the mold.

The electrolyte added to bring about the partial coagulation of the clay slip to allow of its being used in the above manner must also be of such a nature that it will exhibit a minimum tendency to migrate to the mould surface of the articles, where it would cause local vitrification upon the firing of the ware.

The electrolyte used affects all of the above factors, and that electrolyte must be selected which will best satisfy the ideal conditions represented by the above factors. These ideal conditions are: (a) the production of a stable slip of good pouring, casting and draining properties in a minimum time with a proper water content; (b) the layer of solid material should neither be too hard, thus slowing down the casting process too much, nor too soft, thus giving the form poor strength and causing it to drain poorly and set up slowly and crack in drying; (c) the formed green ware should have good "setting" and plastic working properties; (d) the electrolyte should not lower the dry or fired strength of the body; (e) the electrolyte should not concentrate on the surface and cause local or differential vitrification; (f) green ware should be free from pin holes; and (g) there should be a minimum of mold deterioration.

It is common practice to use a mixture of approximately equal proportions of sodium silicate and sodium carbonate (usually in sal soda form). The total concentration usually ranges from 0.4 to 0.5% of the dry body of the cast ware. When sodium carbonate alone is used, a high surface tension is produced and the solid particles tend to "ball up" and cause the entanglement of air bubbles in the slip. Sodium silicate alone tends to produce a "stringy" slip, and it does not hold the clay in suspension so well as sodium carbonate.

Careful tests with sodium aluminate have shown the following advantages of this electrolyte when used as a substitute for sal soda in the usual sodium silicate-sal soda mixture:

A much lower concentration of electrolyte may be used. The usual total electrolyte concentration for sodium silicate-sal soda is 0.4–0.5%, while only 0.25–0.30% is necessary when sodium aluminate is used in place of sal soda. A greater range of electrolyte concentration may be used without materially affecting the casting qualities of the slip. Slips conditioned with sodium silicate and sal soda thicken when standing when not agitated and cast softer than at the time of their preparation. If subjected to continuous agitation they cast harder, and if allowed to stand without agitation require further electrolyte additions, or, if agitated, further body additions. Slips conditioned with sodium aluminate, however, retain their original properties on continuous agitation, and if allowed to stand can be brought back to their original condition by agitation alone. Sodium silicate-sodium carbonate slips often form thick overlaying "scums" of some gel on standing, which are detrimental if not properly handled. Little or no scum forms when sodium aluminate is used in the slips. It therefore follows that sodium aluminate greatly enhances the stability of the slips. Local glazing or vitrification often found on the fired ware when sodium silicate-sodium carbonate is used, has not been found at all when sodium silicate-sodium aluminate is used. When the sodium aluminate is used together with the silicate, an increased dry strength of 20% or more is obtained above that when silicate-carbonate is used.

It has been found that for most clay bodies the preferred reagent, in accordance with the present invention, consists of from 55% to 60% of sodium silicate in admixture with 45% to 40% of commercial sodium aluminate. Having on hand an electrolyte of the composition just stated, it has been found that from 0.20% to 0.30% of this reagent on the basis of the dry body of the ceramic ware is the best proportion for bringing out all the advantages of sodium aluminate.

It has also been found that chemically pure sodium aluminate alone in concentrations of 0.20% to 0.30% is very desirable when the element of time in production of the clay slip is not important. In this case the ultimate effect of sodium aluminate is as great or greater than that of the sodium silicate alone.

It will thus be apparent that sodium aluminate possesses extremely desirable properties when used for purposes of conditioning a clay slip.

The unusual and unexpected results obtained by the use of sodium aluminate make it evident that it could not have been foreseen that the employment of this compound in place of ordinary sal soda would result in such important and valuable properties in the clay slips.

No theory is presented to explain this advantageous action of the sodium aluminate, as the colloidal chemistry of clay slips is so involved that any theory presented could be questioned, and its exposition would not add to the clarity of the disclosure in the present specification.

The essential feature is the substitution and/or use of soluble aluminates such as sodium aluminate, either of the commercial type or chemically pure, for sal soda in the treating of clay slips either with or without the concomitant use of sodium silicate.

What it is desired to protect by Letters Patent is the following:

1. The process of improving the working properties of clay slips which comprises adding thereto sodium silicate and sodium aluminate.
2. The process of improving the working properties of clay slips which comprises adding sodium aluminate thereto.
3. The improvement in the art of working clay slips which consists of the step of adding sodium aluminate thereto.
4. The improvement in the art of working clay slips which consists of the step of adding sodium silicate and sodium aluminate thereto.
5. The improvement in the art of working any suspension of a finely divided mineral matter in water and clay in the art of forming this solid finely divided mineral matter by the process known as casting which improvement consists of the step of adding mixtures of sodium aluminate and other electrolytes.

ROBERT MAYNARD KING.